Figure 1:
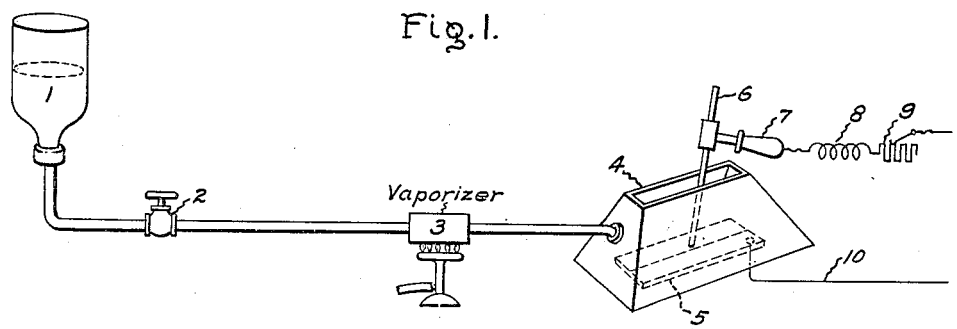

Feb. 4, 1930.    E. THOMSON ET AL    1,746,203
METHOD AND APPARATUS FOR ELECTRIC ARC WELDING
Filed Oct. 6, 1925

Inventors
Elihu Thomson,
Peter P. Alexander,
by
Their Attorney.

Patented Feb. 4, 1930

1,746,203

UNITED STATES PATENT OFFICE

ELIHU THOMSON, OF SWAMPSCOTT, AND PETER P. ALEXANDER, OF MARBLEHEAD, MASSACHUSETTS, ASSIGNORS TO GENERAL ELECTRIC COMPANY, A CORPORATION OF NEW YORK

METHOD AND APPARATUS FOR ELECTRIC-ARC WELDING

Application filed October 6, 1925. Serial No. 60,895.

Our invention relates to electric arc fusion of metals and more particularly to improvements for arc welding in a gaseous medium. Objects of our invention are to provide an improved process and improved equipment whereby sound, reliable and ductile welds may be simply and economically produced.

It has heretofore been found possible to produce ductile welds by the electric arc welding process where the arc and molten portions of the work are surrounded by an atmosphere of hydrogen so as substantially to exclude atmospheric air.

In the copending application of Elihu Thomson, Serial No. 52,680, filed August 26, 1925, for electric welding, it is pointed out that ductile welds may be produced in an atmosphere of carbon monoxide or mixtures of carbon monoxide and hydrogen, and examples are given of gaseous media which may be acted upon by the arc to produce, by dissociation or dissociation and re-combination, such a gaseous mixture. It is pointed out, for example, that a hydrocarbon gas such as propane ($C_3H_8$) with carbon dioxide may be used to produce a resultant mixture comprising hydrogen and carbon monoxide. Where gases which are of definite chemical composition and which dissociate and recombine in the desired manner are used according to such method, little difficulty is presented in supplying the gases in the proper proportions.

In accordance with the preferred form of our invention, we take a single compound of hydrogen the vapor of which is dissociable in the arc to produce free hydrogen without the liberation of oxygen, and which requires no admixture of another gas to produce the resultant desired mixture of gases and apply such vapor so as to surround the arc and exclude atmospheric air from the molten portions of the work. During welding, the dissociating action of the arc produces directly a gaseous mixture which is nonoxidizing and contains hydrogen as an active reducing agent. Preferably we use a volatile carbohydrate such as an alcohol for the purpose described.

We have found that perfectly ductile welds may be produced by dissociating in the arc an alcohol such as methanol or methyl hydrate ordinarily known as wood spirit or methyl alcohol. An advantage of methanol is that it is not of a complex nature, but a single chemically pure product, as may be seen from the chemical formula, which is $CH_3OH$. When in contact with the arc the vapor is decomposed into one volume of carbon monoxide mixed with two volumes of hydrogen. Modern methods of synthetically producing methanol make it one of the cheapest possible sources of a suitable vapor which may be dissociated by the welding arc to yield a suitable gaseous mixture for producing ductile welds. It is a liquid which is stable under atmospheric pressure, and there is, therefore, no need of transportation in gas tanks, and as the liquid boils at a comparatively low temperature, small quantities of it at a time may be fed into a vaporizer and the vapor directed so as to surround the arc and molten portions of the work during welding. Wherever the vapor is in contact with an electric arc stream or with weld metal at high temperature, dissociation takes place producing an active reducing atmosphere without the liberation of oxygen, and the production of ductile welds is assured.

A further advantage we have found over the welding arc in hydrogen is that while the welding arc in substantially pure hydrogen requires a striking voltage of about 120 volts as a minimum to strike and maintain the arc, the arc may be struck and maintained in alcohol vapor from a generator having an open circuit voltage of 75 volts. Therefore a source of welding current which is suitable for ordinary arc welding in air may be used for welding in alcohol vapor. A generator of about this voltage may be used for welding in hydrogen, but in such event sufficient reactance must be placed in the circuit to provide an effective striking voltage of not less than about 120 volts. A reactor suitable for welding in air is, however, sufficient for welding in the alcohol vapor.

The arc voltage in the alcohol vapor is higher than the arc voltage in air, but lower than the arc voltage in substantially pure hydrogen. The critical arc voltage in hydrogen is nearly 40 volts, while the arc voltage in alcohol vapor is approximately two thirds of that in hydrogen. The higher arc voltage makes possible speeds of welding which are greater than are possible when welding in air. Moreover, as in the case of welding in hydrogen, a variation in arc length which would be prohibitive in air is not deleterious in the case of welding in the alcohol vapor. The upper limit of the arc voltage in air is about 25 volts and is still lower where very small electrodes are used. The most suitable arc length in air is, roughly, about equal to the diameter of the electrode used. The arc voltage in the alcohol vapor is near the upper limit of the arc voltage in air, and may be greatly increased. For example, we have successfully welded with arc voltages in excess of 55 volts, and still higher voltages may be used. The critical arc voltage varies slightly but not appreciably with the different readily volatile alcohols. While the arc voltage is thus relatively high, the striking voltage as heretofore indicated is comparatively low, roughly about 65 volts being requisite. A 75 volt generator is ample to strike the arc and weld throughout a considerable range of arc voltage, but where very high arc voltages are desired, a higher voltage generator may, of course, be used.

Methanol, when decomposed by the arc produces a mixture in the proportions of two parts hydrogen to one part carbon monoxide by volume. One pound of methanol will produce more than 30 cu. ft. of the mixture at a temperature of about 20° C. During welding the arc does not, however, dissociate all of the vapor and it need not dissociate even the major portion of the vapor, such dissociation as heretofore indicated taking place principally where the vapor is in contact with the core of the arc stream, which is of tremendously high temperature, and probably to some extent where the vapor is in contact with weld metal at high temperature. An indication of the inexpensive character of gas welding according to our invention is given by the fact that when using an open torch as hereinafter described, a consumption of about one-half gallon of alcohol will be sufficient for eight hours of ordinary and continuous work.

We have used successfully not only methanol or synthetically produced methyl alcohol and wood alcohol or natural methyl alcohol, but have also used grain alcohol or natural ethyl alcohol and denatured grain alcohol, a mixture of ethyl alcohol with wood alcohol, pyridine, kerosene, etc. We have also used acetone or dimethylketone, $CH_3COCH_3$. The welding with acetone alone is, however, not as satisfactory. The weld metal is apt to have many blow-holes, and its carbon content is apt to be higher than that of the adjacent plate, and its ductility is comparatively lower. Such a product is, therefore, more adaptable for use where an auxiliary vaporous medium is admixed which upon dissociation and recombination in the arc produces a resultant suitable mixture. Alcohols or isomeric volatile compounds which are so rich in carbon as to yield an excess of free carbon upon dissociation are likewise more adaptable for use with an auxiliary medium. Such compounds which mix or emulsify when liquids may be vaporized as a single liquid provided the vaporization is carried on at such temperature that both liquids volatilize. Where the liquids do not mix or vaporize in the proper proportions to produce the desired vaporous mixture they may be fed to the vaporizer as liquids in which case the proportioning of the compounds presents no difficulty where the temperature in the vaporizer is sufficiently high for the least volatile liquid.

Our invention is of particular advantage for metallic arc welding where weld metal is deposited from a metallic electrode, for example, an iron or steel electrode. It is unnecessary to provide the electrode with an arc sustaining flux, although we have used suitable fluxes without deleterious effect on the deposited metal. Our invention is, however, not limited to the use of a metallic electrode, since other electrodes, for example, a carbon or a metallic non-consuming electrode may be used. Where the arc is maintained between the electrode and the work, we prefer to use direct current and make the work positive and the electrode negative.

While we believe that methanol, on account of its ease of production by synthetic processes and on account of its cheapness, will be best suited to carry out our invention, it is to be understood that other alcohols or mixtures of alcohols or other carbohydrates derived from or related to the alcohols may be employed. For example, sulphuric ether or methylic ether or methylic oxide, which is isomeric with ethyl alcohol, may be used. In fact, where the composition of the medium is such that it is decomposed in the arc into a mixture having the characteristics of carbon monoxide and hydrogen, the medium may, if a liquid, be used in place of methanol and vaporized either at the arc or before its entrance thereto. Methylic ether, for example, may be transported under moderate pressure as a liquid in closed vessels and can be used on being allowed to vaporize as it enters the arc, or it may be used when mixed in varying proportions, depending on circumstances with other carbohydrates which may have higher boiling points. Our invention contemplates the use of volatile carbohydrates or substances so akin in chemical composition that they may, for the purpose of our invention, be considered the same as or an equivalent of methanol.

Our invention may be used for manual arc welding or for semi-automatic arc welding or for fully automatic arc welding. In manual arc welding the operator holds the electrode in a suitable holder and strikes and manipulates the arc manually. In semi-automatic arc welding suitable means are provided for automatically feeding the electrode forward to compensate for its consumption, and in fully automatic machines means are provided for not only automatically feeding the electrode to maintain the arc but also for producing relative movement between the electrode and work along the line of the desired weld.

Our invention will be better understood from the following description taken in connection with the accompanying drawings, and its scope will be pointed out in the appended claims.

Figure 2:
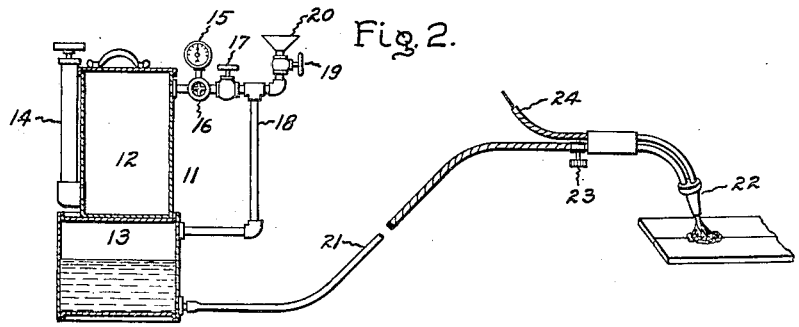
Figure 3:
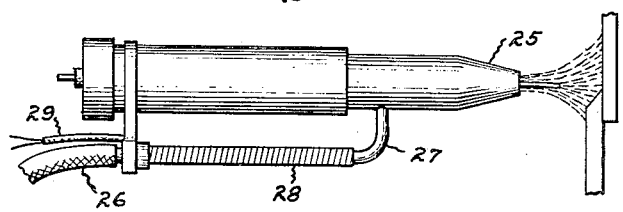
Figure 4:
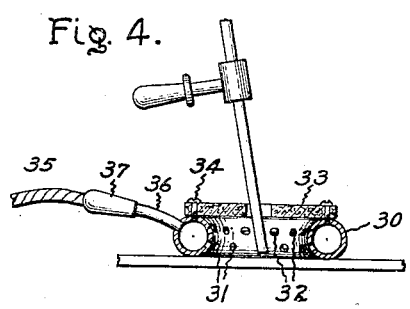

Referring to the accompanying drawing, Fig. 1 shows diagrammatically an apparatus suitable for carrying out our invention illustrated as applied to manual welding with either a carbon or metallic electrode; Fig. 2 shows an arrangement adapted for semi-automatic arc welding and in section a portable container from which the welding liquid is supplied to the arc; Fig. 3 shows a welding tool provided with an electric heater for vaporizing or dissociating the welding liquid; and Fig. 4 shows a form of apparatus that may be used in place of the hood of Fig. 1.

In Fig. 1 the welding liquid, which for convenience we shall refer to as methanol since we find that this liquid is particularly suitable for our process of welding, is supplied from a container 1 by gravity through a regulating valve 2 to a vaporizer 3. This vaporizer may be of any convenient type. It may consist, for example, of a piece of pipe, straight or coiled, heated to a moderate temperature by any suitable means. The heating means is shown in Fig. 1 as a Bunsen burner. The vapor as it issues from the vaporizer is indicated as supplied to a hood 4 so that the vapor surrounds the arc and molten portions of the work 5. The electrode 6 is indicated as held in a suitable holder 7 adapted to be manipulated to cause the arc to be established and maintained between the electrode and the work during the welding operation. The electrode 6 which may be either a metallic or carbon electrode is connected to one side of a supply circuit through a reactor 8 and a resistor 9. Lead 10 is shown for connecting the work to the other side of the supply circuit. In order to simplify the drawing the source is not shown but it may be a constant potential source where a series stabilizing resistor such as 9 is used or the source may be an inherently regulated generator which may supply the arc without the use of a stabilizing resistor.

Fig. 2 shows our process applied to semi-automatic arc welding and shows one form of container in which pressure is used for supplying the liquid for welding. In this modification the liquid is indicated as supplied to the welding tool without first being vaporized. The container 11 is provided with two compartments 12 and 13. In the upper compartment 12 a suitable air pressure is maintained by means of a pump 14. The extent of this pressure is indicated by a gauge 15. The upper compartment 12 is shown connected through pressure regulating valve 16, stop valve 17, and pipe line 18 to the lower compartment 13. Liquid may be supplied to this lower compartment 13 by closing valve 17 and opening valve 19 and applying liquid to the funnel 20 which liquid will be supplied by pipe line 18 to the lower chamber. When a suitable amount of liquid has been placed in this lower compartment 13, valve 19 is closed, valve 17 opened and valve 16 set for any pressure found necessary to give the desired flow of liquid from chamber 13 through the flexible supply line 21 to the welding tool 22. The extent of this pressure will depend on the nature of the liquid, the size of the tube 21 and the design of the welding nozzle. The welding electrode or pencil is fed to the welding tool 22 through a flexible delivery tube 24. A suitable valve 23 is provided at or near the welding tool so that the operator may conveniently regulate the supply of liquid to the arc. While the pressure-regulating valve on the container will be advantageous, it is not essential since a sufficiently constant pressure may be maintained by observing the gauge and pumping up the pressure when necessary thereby maintaining the pressure within proper limits. Where the pressure-regulating valve is not used, it is not necessary to use the two-part container. We have not illustrated the electrode feeding mechanism or the whole of the flexible electrode guide tube in Fig. 2 since these parts are well known in the art of arc welding in air. An example of such apparatus is shown, for example, in Letters Patent to Noble 1,508,711, dated September 16, 1924.

In Fig. 2 we have shown our invention as applied to a semi-automatic apparatus wherein the arc is maintained between a fusible metal electrode and the work. In this type of apparatus the operator manually holds or guides the welding device or tool over the work to be welded and automatic means feeds the metallic electrode or wire through the tool toward the work to maintain the arc. In such an apparatus the rate at which the electrode is fed may be automatically regulated to maintain the arc length substantially constant. An example of such means is shown in Letters Patent to Noble 1,058,711, heretofore referred to. To convert such apparatus into a fully automatic machine it is merely necessary to provide suitable means for automatically producing relative movement between the electrode and the work along the line of the joint to be welded. The electrode will thus not only be fed automatically to maintain the arc but the movement along the joint to be welded will also be effected automatically.

In Fig. 3 we have shown an electric heater associated with a suitable means for controlling an electrode whereby a liquid may be vaporized or vaporized and heated before being supplied to the point of welding. The device of Fig. 3 is described and claimed in the application of Sven R. Bergman, Serial No. 48,152, filed August 4, 1925, now Patent 1,716,614, granted June 11, 1929, assigned to the same assignee as the present application. In this apparatus the welding electrode is fed to the nozzle 25 by suitable means at a rate dependent upon the rapidity of its consumption and the welding medium is supplied through a flexible tube 26 and a pipe 27 to this nozzle, from which is is emitted about the electrode and over the molten portions of the weld metal. Pipe 27 is heated by a coil 28 which is connected to any suitable source of supply by conductors 29. The heating element 28 may consist of a hollow conductor through which the medium is supplied.

In Fig. 4 we have shown an attachment which may be used with advantage in many places where a hood such as 4 in Fig. 1 could not readily be used. This attachment comprises a ring member 30 provided with two rows of holes 31 and 32 placed on opposite sides of the medial line of the ring in staggered relation to each other. The lower set of holes is ararnged to direct the welding medium downward about the arc and weld metal; while the upper set of holes 32 is arranged to discharge the medium in an upward direction. The ring is provided with a cover member 33 of asbestos or other suitable material which is secured to the ring by screws 34. This cover member 33 is provided with an opening through which the welding electrode may be inserted toward the work. The welding medium is supplied to this ring by a flexible hose 35 and a tube 36 which is provided with a handle 37 which enables the operator readily to position the ring upon the work and move it about. A liquid may be supplied directly to this ring in which case it will be vaporized in the ring due to the heat of the arc about which it is placed and the resulting vapor will be discharged to surround the work and weld metal. At the arc the vapor will be dissociated into its constituent parts which, in the case of methanol are carbon monoxide and hydrogen. Whatever vapor escapes through the opening in cover 33 will burn in contact with the air.

It is preferable to make the ring member 30 of copper or some other metal to which deposits from the arc will not readily attach themselves.

Our invention is to be distinguished from work which has been done heretofore, particularly in the incandescent lamp art, where an arc is started and quickly interrupted while the parts are protected from oxidation by a suitable medium. According to this prior art, a brief localized heating effect is utilized to produce a small globule of metal to secure a filament to a supporting wire, for example. There is no maintained arc as in our process, and the molten metal is not subjected to the action of an active reducing gaseous medium, as in our process. In such lamp work the circuit is interrupted at the time the metal begins to fuse or soften, whereas, with the maintained arc, a pool of molten metal in the work constitutes one terminal of the arc stream.

The application of Irving Langmuir, Serial No. 729,185, filed July 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when our invention is used, we make no claim to such subject matter since the Langmuir invention is earlier than our invention.

While we have described the preferred form of our invention in accordance with the patent statutes, and have indicated certain modifications, it is to be understood that further changes and modifications may be made without departing from our invention. It is apparent, for example, that constituents may be added to the welding medium as harmless diluents or to secure added results. We therefore aim in the appended claims to cover all such modifications and variations as fall within the true spirit and scope of our invention.

What we claim as new and desire to secure by Letters Patent of the United States, is:

1. The method of fusing metals by the electric arc process which comprises maintaining an arc and surrounding the arc and molten portions of the metal with the vapor of an alcohol to exclude atmospheric air while dissociating alcohol vapor in the arc to produce an active reducing gaseous medium comprising hydrogen and carbon monoxide.

2. The method of electric arc welding which comprises maintaining the arc between the work and a fusible metallic electrode while supplying vapor of methyl alcohol so as to surround the arc and exclude atmospheric air from the molten portions of the weld metal.

3. The method of electric arc welding comprises maintaining the arc, vaporizing an alcohol and supplying the vapor so as to exclude atmospheric air from the arc and molten portions of the work while dissociating the vapor in the arc to produce hydrogen and carbon monoxide.

4. The method of electric arc welding with a maintained arc in a reducing gaseous medium which comprises dissociating methyl alcohol in the arc.

5. The method of producing welds by the electric arc process which comprises maintaining an arc, vaporizing from liquid form a compound of hydrogen which is dissociable in the arc to produce free hydrogen substantially without liberation of oxygen whereby said vapor may be used alone to produce a reducing gaseous medium, and supplying said vapor so as to surround the arc and exclude atmospheric air from the molten portions of the work while dissociating said compound to produce a non-oxidizing medium containing hydrogen as an active reducing agent.

6. The method of electric arc welding which comprises maintaining an arc and surrounding the arc with the vapor of a volatile carbohydrate dissociable in the arc to produce a reducing gaseous mixture containing carbon monoxide and hydrogen.

7. Apparatus for electric arc welding comprising means for maintaining an arc, a source of alcohol means for producing alcohol vapor from said source and means for supplying said vapor so as to surround the arc and exclude atmospheric air from the molten portions of the work.

8. Apparatus for electric arc welding in a gaseous medium comprising means for maintaining an arc, a container for holding a vaporizable medium, means comprising a conduit for conveying said medium to the arc, and means for vaporizing said medium before it reaches the arc.

In witness whereof, ELIHU THOMSON has hereunto set his hand this second day of October, 1925, and PETER P. ALEXANDER has hereunto set his hand this second day of October, 1925.

ELIHU THOMSON.
PETER P. ALEXANDER.